US010998969B2

(12) United States Patent
Tempone et al.

(10) Patent No.: US 10,998,969 B2
(45) Date of Patent: May 4, 2021

(54) FOCAL PLANE ASSEMBLY FOR MULTI-ACCESS FREE SPACE OPTICAL COMMUNICATIONS TRANSCEIVERS

(71) Applicant: Skyloom Global Corp., Berkeley, CA (US)

(72) Inventors: Santiago Tempone, Berkeley, CA (US); Marcos D. Franceschini, Berkeley, CA (US)

(73) Assignee: Skyloom Global Corp., Berkeley, CA (US)

(*) Notice: Subject to any disclaimer, the term of this patent is extended or adjusted under 35 U.S.C. 154(b) by 0 days.

(21) Appl. No.: 16/833,141

(22) Filed: Mar. 27, 2020

(65) Prior Publication Data

US 2020/0366371 A1    Nov. 19, 2020

Related U.S. Application Data

(60) Provisional application No. 62/826,727, filed on Mar. 29, 2019, provisional application No. 62/826,751, filed on Mar. 29, 2019, provisional application No. 62/826,803, filed on Mar. 29, 2019, provisional application No. 62/826,717, filed on Mar. 29, 2019.

(51) Int. Cl.
*H04B 10/112* (2013.01)
*G02B 6/42* (2006.01)
*H04Q 11/00* (2006.01)
*H04B 10/2575* (2013.01)

(52) U.S. Cl.
CPC ....... *H04B 10/1123* (2013.01); *G02B 6/4206* (2013.01); *H04B 10/25759* (2013.01); *H04Q 11/0005* (2013.01); *H04Q 2011/0026* (2013.01)

(58) Field of Classification Search
CPC .......... H04B 10/1123; H04B 10/25759; G02B 6/4206; H04Q 11/0005; H04Q 2011/0026
See application file for complete search history.

(56) References Cited

U.S. PATENT DOCUMENTS

| | | | | |
|---|---|---|---|---|
| 4,652,081 | A * | 3/1987 | Fatatry | G02B 6/38 385/22 |
| 8,929,695 | B1 * | 1/2015 | Gattass | G02B 6/3558 385/16 |
| 9,417,395 | B2 * | 8/2016 | Xia | G02B 6/3562 |
| 10,404,028 | B2 * | 9/2019 | Pechter | H01R 43/28 |

(Continued)

*Primary Examiner* — Mina M Shalaby
(74) *Attorney, Agent, or Firm* — Knobbe Martens Olson & Bear LLP (57) ABSTRACT

Systems and methods are described for providing high throughput connectivity between multiple network nodes, such as satellites in Earth orbit or ground stations, using a multi-access free space optical communications transceiver. The transceiver includes a focal plane assembly with an array of moveable optical fibers or fiber bundles, multi-core fibers, or a combination thereof. Each optical fiber bundle may include a centrally-located data fiber with guide fibers disposed around the data fiber. A controller may align a tip of the data fiber with a focal spot associated with incoming optical signals based on measured power levels of optical signals received in the guide fibers. The data fiber may be a multi-mode fiber (MMF) and circuitry in the transceiver may couple signals from the MMF into separate single-mode fibers (SMF) and then coherently combine signals from the SMFs.

16 Claims, 7 Drawing Sheets

(56) References Cited

U.S. PATENT DOCUMENTS

| | | | |
|---|---|---|---|
| 2003/0091272 A1* | 5/2003 | Sigloch | G02B 6/3582 |
| | | | 385/22 |
| 2004/0057654 A1* | 3/2004 | Baasch | G02B 6/3572 |
| | | | 385/16 |
| 2013/0315271 A1* | 11/2013 | Goodno | H01S 3/1307 |
| | | | 372/31 |
| 2016/0282273 A1* | 9/2016 | Bi | G01N 21/49 |
| 2019/0212420 A1* | 7/2019 | Petit | G01S 17/10 |
| 2019/0310465 A1* | 10/2019 | Petit | H02N 2/062 |
| 2020/0011995 A1* | 1/2020 | Send | G01S 7/4817 |

* cited by examiner

FOCAL PLANE ASSEMBLY FOR MULTI-ACCESS FREE SPACE OPTICAL COMMUNICATIONS TRANSCEIVERS

INCORPORATION BY REFERENCE

Any and all applications for which a foreign or domestic priority claim is identified in the Application Data Sheet as filed with the present application are hereby incorporated by reference under 37 CFR 1.57. This application claims the benefit of each of the following patent applications: U.S. Provisional Application No. 62/826727, filed Mar. 29, 2019, entitled "SYSTEMS AND METHODS FOR FREE SPACE OPTICAL COMMUNICATIONS INCLUDING SATELLITE REPEATER;" U.S. Provisional Application No. 62/826751, filed Mar. 29, 2019, entitled "SATELLITE TRANSCEIVER FOR MULTI-ACCESS FREE SPACE OPTICAL COMMUNICATIONS;" U.S. Provisional Application No. 62/826803, filed Mar. 29, 2019, entitled "FOCAL PLANE ASSEMBLY FOR MULTI-ACCESS FREE SPACE OPTICAL COMMUNICATIONS TRANSCEIVERS;" and U.S. Provisional Application No. 62/826717, filed Mar. 29, 2019, entitled "SATELLITE TRANSCEIVER TERMINAL FOR FREE SPACE OPTICAL COMMUNICATIONS." Each of the provisional applications listed in this paragraph is incorporated by reference herein in its entirety.

TECHNOLOGY BACKGROUND

Field

The present disclosure relates to optical communications, and more particularly to providing high throughput connectivity for free space optical communications.

Description of the Related Technology

Communications connectivity is desirable for many applications. Internet connections, cellular connectivity, satellite communications, and other telecommunications technology rely on such connectivity. However, existing solutions have limited bandwidth which limits the amount of data that can be communicated. Improvements to communications technology are therefore desirable.

SUMMARY OF VARIOUS FEATURES

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Illustrative Embodiments," one will understand how the features of the embodiments described herein provide advantages over existing systems, devices, and methods for optical communications technology.

The development relates to systems, devices, and methods for high throughput optical communications technology. The development may be used, for example, between ground-based networks and spacecraft in Earth orbit, deep space, or in orbit around other celestial bodies. As the size and cost of satellites has been falling (see, e.g., CubeSats and other low cost satellites), and launch costs have been falling with the rise of re-useable rockets and ridesharing, increasing numbers of spacecraft are launched each year. Some companies have disclosed plans to launch entire constellations of earth orbiting satellites which may benefit from the development. For example, SpaceX has disclosed plans to launch over 12,000 satellites (split between 200 mile and 700 mile orbits) to provide worldwide satellite-based internet coverage. Individual satellites and satellite constellations can benefit from the developments disclosed herein.

These and other applications, such as Earth imaging and Internet of Things (IoT) satellites, benefit from or even require high bandwidth communication links. For example, an imaging satellite that captures new imagery and/or video daily (or on each orbital pass) may require a communication link with sufficient bandwidth to send each day's (or each orbital pass's) imagery to a ground station. More importantly, immediate link availability after image acquisition is a highly desired and currently unavailable feature for a space-to-ground network. As further example, a satellite constellation providing worldwide internet coverage may require high-speed communication links both within the constellation and between the constellation and a ground station. The current development is capable of meeting the connectivity needs of these and other applications.

The development relates to free space optical (FSO) communications systems methods. The FSO development may rely upon modulated laser light traveling in a line of sight path, and can provide high bandwidth communications in point-to-point links while avoiding the electromagnetic interference issues of radio communications. The optical communications described herein use light propagating in free space to wirelessly transmit data. The communications signal may be transmitted using a laser. The optical communications signals may have a particular wavelength and/or frequency, or may have several particular wavelengths and/or frequencies. The optical signals may be used for data communication. High speeds or rates of data communication are provided by the systems and methods herein. The rate of data transmission may be, for example, at least 0.1 gigabit per second (Gbps), at least 1 Gbps, at least 100 Gbps, at least 200 Gbps, at least 500 Gbps, at least 1 terabit per second (Tbps), or more.

In some embodiments, systems and methods for providing high throughput connectivity between various network nodes, such as between satellites in Earth orbit and ground stations, using a multi-access free space optical transceiver, are described. The multi-access free space optical transceiver may include an array of moveable optical fiber bundles. Each optical fiber bundle may include a centrally-located data fiber with guide fibers disposed around the data fiber. Control circuitry may measure power levels of optical signals received in the guide fibers and may use differences in the measured power levels between guide fibers in a given fiber bundle to align the data fiber with a focal spot associated with incoming optical signals. The multi-access free-space optical transceiver may be included within a communications relay satellite at GEO in order to relay communications between low earth orbit (LEO) satellites and at least one ground station.

Systems and methods are described for providing high throughput connectivity between multiple network nodes (satellites, ground stations, etc.) using a transceiver with a focal plane assembly having an array of moveable optical fibers, movable fiber bundles and/or moveable multi-core fibers. Each optical fiber bundle may include a centrally-located data fiber with guide fibers disposed around the data fiber. A controller may align the data fiber with a focal spot associated with incoming optical signals based on measured power levels of optical signals received in the guide fibers.

In some embodiments, a focal plane solution for a free-space optical communications transceiver is described. The transceiver may be a multiple-to-one transceiver, but the features may be used with other transceiver types as well. Features are described for efficient direct fiber coupling and dynamic tracking of moving nodes transmitting data to, or receiving data from, one node. Features are described for acquiring and maintaining an optical communications channel (transmit and receive) between one node and multiple nodes simultaneously using only one optical antenna. Features are described for dynamic fine-tracking of a moving spot of light in the focal plane of an optical system. A novel design to allow for direct fiber coupling of light onto a guided channel for high-speed optical communications and tracking of moving targets are described. Some embodiments may use of 3D micro-printing to allow for the use of a single multi-core fiber to be used for both tracking and high-speed communications.

BRIEF DESCRIPTION OF THE DRAWINGS

The foregoing and other features of the present disclosure will become more fully apparent from the following description and inventive aspects, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and inventive aspects are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure.

DETAILED DESCRIPTION OF CERTAIN ILLUSTRATIVE EMBODIMENTS

In order to satisfy growing demand for high-bandwidth connectivity between, for example, ground-based networks, spacecraft, airborne vehicles, and ground stations, the present disclosure provides a network architecture to enhance optical communications. The network described herein allows for high-bandwidth free space optical communications. "Free space" as used herein has its usual and customary meaning and may refer to, without limitation, mediums such as air, lower and upper planetary atmospheres, near space, outer space, vacuums, or the like. This may be in contrast with, for example, mediums such as solids, for instance optical fiber cable.

The communication may be between a constellation of satellites in Low Earth Orbit (LEO) and one or more ground stations via a relay satellite (sometimes referred to as a repeater). The relay satellite may also relay free space optical communications between satellites (in LEO and in Medium Earth Orbit (MEO)), ground stations, aircraft (e.g., commercial aircraft, military aircraft, high-altitude balloons, pseudo-satellites, etc.), ships (e.g., watercraft of varying sizes), land vehicles, and other network users. The relay satellite may be, in some embodiments, in a relatively high orbit to increase the number of satellites within line of sight of the relay satellite. As examples, the relay satellite may in a Geosynchronous or Geostationary Earth Orbit (GEO), a Medium Earth Orbit (MEO), or a High Earth Orbit (HEO). Additionally, the relay satellite may have optics with a field of view wide enough to encompass the Earth and satellites in LEO.

In general, Low Earth Orbits (LEO) may include orbits having an altitude of less than approximately 1,200 miles or orbits with an orbital period of no more than approximately 128 minutes and an eccentricity of less than 0.25. Geostationary or Geosynchronous Earth Orbit (GEO) may include orbits with an orbital period that matches the Earth's sidereal day (e.g., the Earth's rate of rotation measured relative to distant stars, which is one revolution approximately every 23 hours, 56 minutes, and 4 seconds). A geostationary orbit is a particular kind of geosynchronous orbit that lies in Earth's equatorial plane such that objects in a geostationary orbit appear stationary to observers on Earth's surface. Objects in geosynchronous orbits in orbital planes angled with respect to the equatorial plane may appear to wander around a fixed point in the sky when viewed by an observer on Earth's surface. "GEO" as used herein may include both geostationary and geosynchronous orbits. The GEO orbiting object may therefore remain over, or generally around, the same point on the ground as the earth orbits. A GEO object may remain with a given field of view or line of sight for a particular position on the ground. Medium Earth Orbits (MEOs) may be the orbits between LEO and GEO, while High Earth Orbits (HEOs) may be orbits above GEO.

A relay satellite may have multi-user optical communication abilities, in which multiple LEO satellites and/or other nodes simultaneously connect via separate free space optical paths to the relay satellite. Such arrangements may enable the relay satellite to communicate with multiple LEO satellites simultaneously. In some embodiments, the relay satellite includes an array of optical fibers disposed at the focal plane of an optical antenna (which may occasionally be referred to as a telescope or camera system), and each optical fiber may be moveable within at least a sub-region of the array. A relay satellite may, in some embodiments, have multiple optical antennas with one or more moveable optical fibers in a focal plane of each of the optical antennas for multi-access communication. With such arrangements, each optical fiber can be moved within the array to achieve direct fiber coupling, where the optical fiber is directly coupled to the optical signals of an associated free space optical path.

Figure 1:
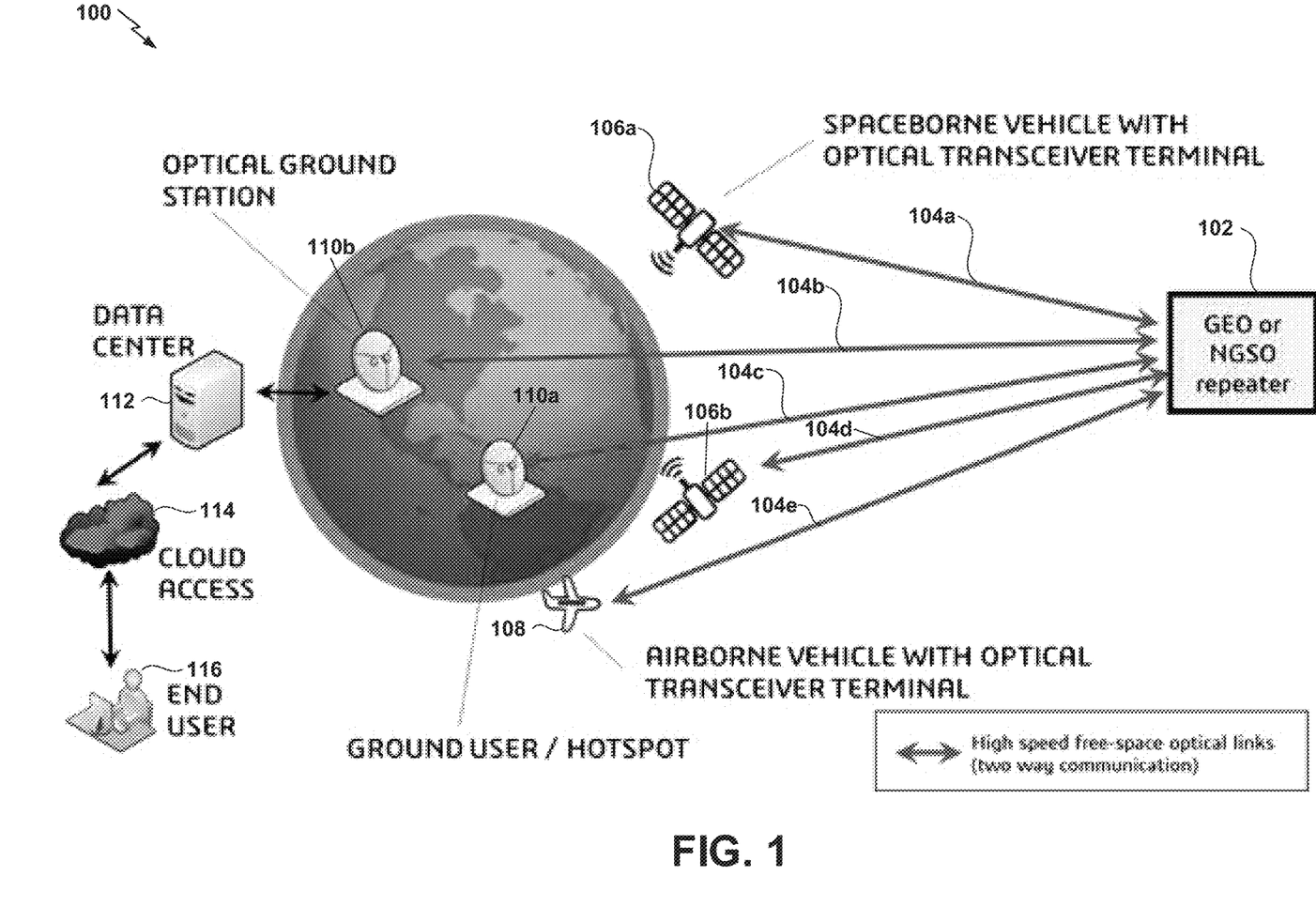
FIG. 1 is a schematic representation of an embodiment of a free space optical (FSO) communications network architecture including a repeater on a satellite in orbit, for example GEO orbit.

FIG. 1 is a schematic representation of an embodiment of a free space optical (FSO) communications network 100 architecture including a repeater 102 on a satellite in orbit about Earth. As shown in FIG. 1, the network 100 may include a repeater 102 of the orbiting relay satellite. Repeater 102 may, in at least some embodiments, be configured for operation at GEO or non-geosynchronous orbit (NGSO), or other orbits such as HEO, MEO, or LEO. Repeater 102 may also be configured to establish and maintain simultaneous free space optical communications links 104a-104e with network users such as spacecraft 106a and 106b, airborne vehicle 108, and/or ground stations 110a and 110b. Each of the network users or nodes (e.g., spacecraft 106a and 106b, airborne vehicle 108, and ground stations 110a and 110b) may have an optical transceiver terminal. In some embodiments, the ground stations 110a and 110b may be located at disparate sites chosen to maximize the amount of time at least one of the ground stations has a clear view, unobstructed by clouds, of the repeater 102.

The communications links established with the repeater 102 may provide communications between any of the nodes of the network 100. The repeater 102 may allow for communications between any of one or more of a first group of nodes with any of one or more of a second group of nodes. The first or second groups of nodes may include any of the spacecraft 106a and/or 106b, the airborne vehicle 108, the ground station 110a and/or 110b, the data center 112, the cloud access 114, the end user 116. Other nodes may be included, such as communications systems associated with ships at sea and automobiles. Thus the particular architecture shown is merely one example embodiment.

Network 100 may also include connections with terrestrial networks. As an example, network 100 may couple to terrestrial networks through ground stations. In the example of FIG. 1, network 100 connects, via ground station 110b, to data center 112, network 114 (which may be a wide area network such as the Internet), and end user 116.

In some embodiments, the repeater 102 may be used in other contexts. The repeater 102 may be used on the ground or on the other nodes of the network 100. The repeater 102 may be used on satellites in orbit about other planets in space. The repeater 102 may be used to communicate with nodes that are in orbit about other planets in space. There may be multiple, for example two or more, repeaters 102 in the network 100.

Figure 2:
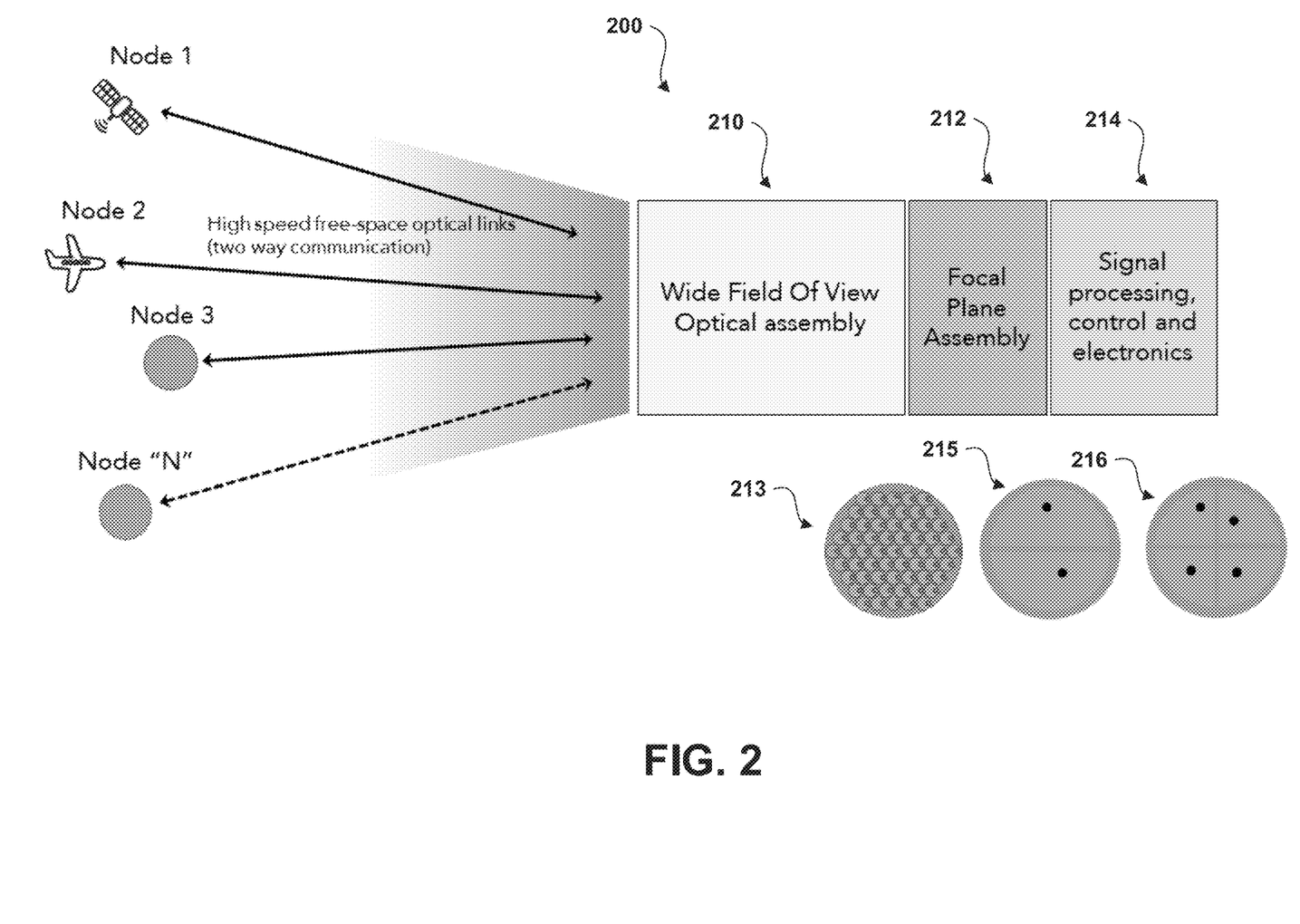
FIG. 2 is a schematic representation of an embodiment of a multi-access free-space optical communications transceiver, which may be used with the repeater of FIG. 1.

FIG. 2 is a block diagram of an embodiment of a transceiver 200 that may incorporate the repeater 102 and be used with the GEO satellite in the network 100. The transceiver 200 includes an optical antenna 210 shown as a wide field of view (FOV) optical assembly, a focal plane assembly 212 including an array of optical fibers 213 or 215 or 216, and electronics 214 including electronics for signal processing and control. The focal plane assembly 212 and the array of optical fibers 213 may include an array of actuators, as further described herein, for example with respect to FIG. 3. Optical signals may be received through the optical antenna 210 from an external network node 1, 2, 3 ... N. The signals may be collected and sorted for processing in the focal plane assembly 212. Some of the network nodes include satellites in LEO (e.g., satellites moving at a high velocity, often across the FOV of optical assembly 210). In such cases, maintaining each communications link network node may involve dynamically positioning one or more optical fibers using coarse positioning actuator or actuators to maintain that link as the associated network node travels across the FOV of the optical assembly 210, as further described herein. The electronics 214 may then analyze the signals and control the focal plane assembly 212 or components thereof.

The transceiver 200 may, alternatively or additionally, be included within other nodes of the network 100 such as satellites 106a and 106b, ground stations 110a and 110b, airborne vehicle 108, and/or other nodes. The transceiver 200 may be a single optical antenna multiple-to-multiple transceiver supporting multiple external optical links uniquely coupled to multiple (and respective) data channels within the transceiver. The transceiver 200 may therefore support multiple bidirectional communications channels using a single optical antenna. As shown in FIG. 2, the multi-access free-space optical communications transceiver 200 may simultaneously couple to multiple network nodes (e.g., Node 1 to Node "N").

The transceiver 200 may include a processor and/or memory. The control circuit or circuitry described herein may include the processor and/or the memory. The memory may be local or remote and have instructions stored thereon. The processor may execute the instructions stored in memory to perform the various functions and methods described herein, for example receiving communications signals, analyzing the signals, controlling drivers and fiber or lens array positions, performing image analysis, communicating with other components of the repeater 102a and/or transceiver 200, controlling the attitude and/or trajectory of the satellite, transmitting communications, performing predictive modeling of the shape of a focal spot of incoming optical signals (which may be used for fine positioning adjustments of one or more optical fibers), etc.

Transceiver 200 may include components such as a wide field of view (FOV) optical assembly 210; a focal plane assembly 212, which may include an array of optical fibers 213 or 215 or 216; and signal processing, control, and electronics 214. Details of the focal plane assembly 213 and array of optical fibers 213 as well as the signal processing, control, and electronics 214 are discussed below in connection with at least FIG. 3.

The optical assembly 210 may include a single optical antenna. The single optical antenna may collect incoming optical signals and transmit outgoing optical signals using a field of view (FOV). The FOV may be relatively wide. The optical assembly 210 may focus incoming optical signals (transmitted from other network nodes) onto a focal plane (e.g., onto the focal plane assembly 212). On the focal plane, the location of the focal spot may vary with the position of the origin of the corresponding incoming optical signal. The optical assembly 210 may transmit outgoing optical signals from a focal spot to an external network node, where the focal spot is selected in order to aim the optical signals at the external network node. In some embodiments, the optical assembly 210 includes a single optical antenna having a relatively wide FOV. In other embodiments, the optical assembly 210 includes an array of individual optical antennas. The individual optical antennas may each have a relatively wide FOV (e.g., a FOV of at least 10 degrees, at least 15 degrees, at least 20 degrees, at least 25 degrees, at least 30 degrees, at least 35 degrees, at least 40 degrees, at least 45 degrees, etc.). In other embodiments, the individual optical antenna may each have a relatively narrow FOV, where the narrow FOVs are offset but overlapping such that the overall FOV is relatively wide. In such embodiments, the focal plane assembly 212 may be an array of focal plane assemblies, each of which is coupled to a respective one of the individual optical antennas. In other such embodiments, the array of individual optical antennas may be coupled to a common focal plane assembly 212. In some other embodiments, the focal plane assembly 212 may be an array of single optical fibers (or fiber bundles of the type shown in FIGS. 4 and 7) and the optical assembly 212 may include an array of individual optical antennas (each having a relatively narrow FOV as described above), where each individual optical antenna is coupled to a different one of the single optical fibers.

The FOV of optical assembly 210 may be enough that the transceiver 200 (particularly when implemented within the repeater 102 of a relay satellite) can "see" satellites in LEO, regardless of their position within their respective orbit (excepting when the satellites pass behind the Earth). Thus, the optical assembly 210 may be modified depending on the desired orbital altitude (a higher orbit may require a smaller FOV to capture the same region of space). If the transceiver 200 is implemented within a network node positioned at or near geostationary orbit (GEO), the Earth may have an angular size (from the relay satellite's perspective) of just over 20 degrees. Accordingly, it may be desirable to configure optical assembly 210 to have a field of view slightly larger than 20 degrees to also cover low earth orbits (which increase the desired angular size).

Therefore, the field of view can be various sizes in various embodiments. As examples, the optical assembly 210 may have a field of view of at least 2 degrees, at least 4 degrees, at least 10 degrees, at least 15 degrees, at least 20 degrees, at least 25 degrees, at least 30 degrees, at least 35 degrees, at least 40 degrees, at least 45 degrees. As further example, the optical assembly 210 may have a field of view of 2 degrees, of 4 degrees, of 10 degrees, of 15 degrees, of 20 degrees, of 25 degrees, of 30 degrees, of 35 degrees, of 40 degrees, or of 45 degrees. As further example, the optical assembly 210 may have a field of view of approximately 2 degrees, of approximately 4 degrees, of approximately 10 degrees, of approximately 15 degrees, of approximately 20 degrees, of approximately 25 degrees, of approximately 30 degrees, of approximately 35 degrees, of approximately 40 degrees, or of approximately 45 degrees. "Approximately" may refer to a value within +/−5 degrees of the given value for a given value or, for values of 10 degrees or less, within +/−50% of the given value.

As shown in FIG. 2, focal plane assembly 212 may include an array 213 or 215 or 216 of optical fibers. The optical fibers may be mounted on electro-mechanical or piezoelectric (PZT) actuators that provide at least two degrees of freedom (e.g., provide controlled movement within the focal plane), in order to, for each individual optical channel, dynamically position an optical fiber at the focal spot associated with incoming (or outgoing) free space optical signals. In order to support multiple network connections, multiple optical fibers may be individually positioned, such that there is a single active fiber that is properly positioned for each network connection. One advantage of this type of arrangement is scalability. In particular, the number of optical fibers can be increased (and the optics modified to enlarge the focal plane and/or the patrol area of each fiber shrunk) in order to increase an available number of simultaneous connections.

Figure 3:
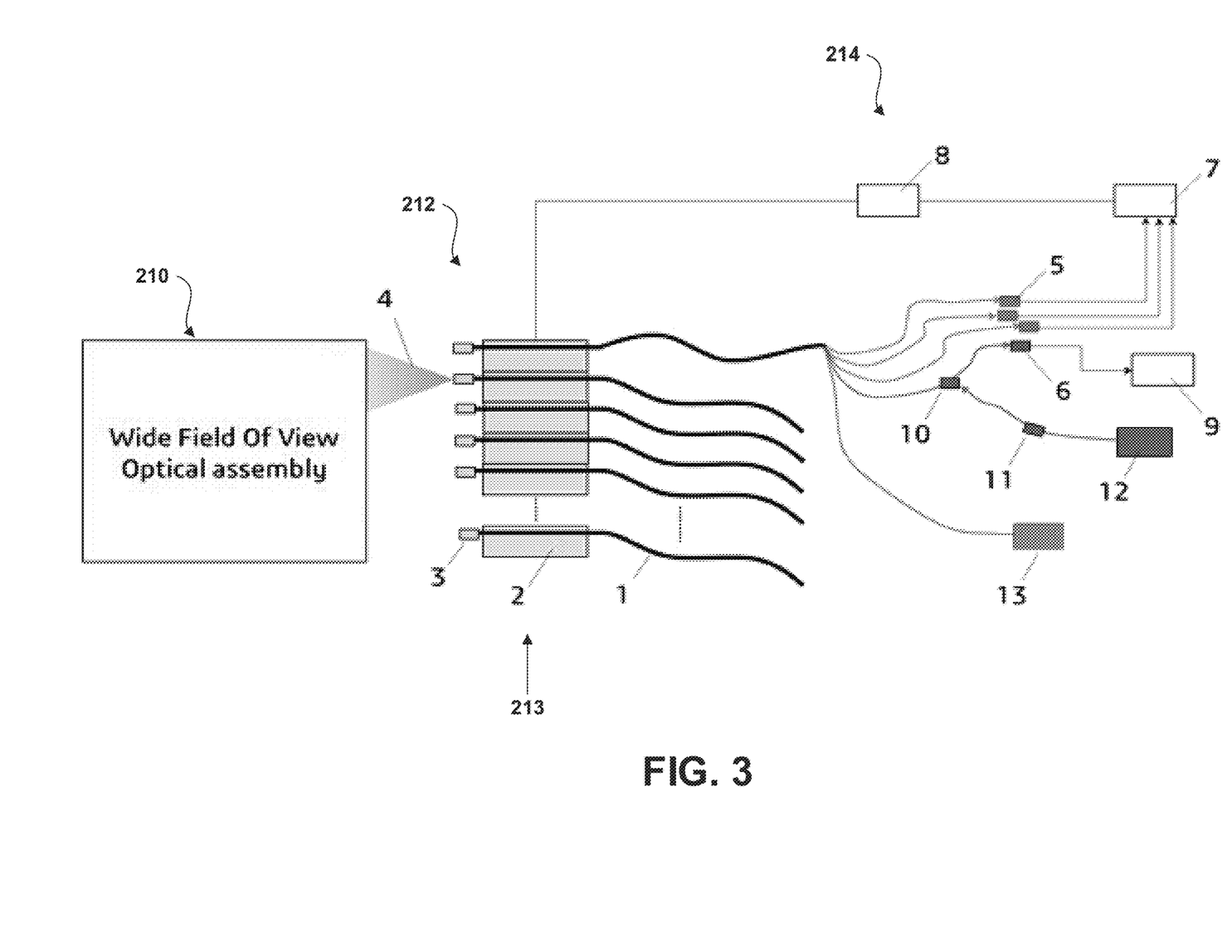
FIG. 3 is a block diagram of an embodiment of a focal plane assembly and associated signal processing, control, and electronics, which may be used with the multi-access free-space optical communications transceiver of FIG. 2.

FIG. 3 is a schematic representation of an embodiment of a focal plane assembly 212 and associated signal processing, control, and electronics, which may be used as the focal plane assembly 212 and the signal processing, control, and electronics 214 of FIG. 2.

As shown in FIG. 3, focal plane assembly 212 and the array 213 of optical fibers 1 may include an array of actuators 2. Each actuator 2 may be configured to dynamically position a respective single mode optical fiber, multi-mode optical fiber, few- mode optical fiber, large mode area (LMA) fiber, and/or multi-core optical fiber 1 and associated end-cap 3. Optical fiber 1 may include a bundle of any of these fibers, for example, a bundle of single-mode fibers, a bundle of multi-mode fibers, or a bundle with both single-mode and multi-mode fibers. Optical signals coming from an external network node may be focused onto a spot within a focal plane where the position of that spot depends on the position of the external network node within the FOV of the optical assembly 210. In some embodiments, some of the network nodes include satellites in LEO (e.g., satellites moving at a high velocity, often across the FOV of optical assembly 210). In such cases, maintaining each communications link network node may involve dynamically positioning one or more optical fibers to maintain that link as the associated network node travels across the FOV of the optical assembly 210. Thus, each actuator or set of actuators 2 may dynamically position a respective optical fiber 1 and/or associated end-cap in order to maintain tracking with a moving spot of converging light 4 coming from a particular network node.

In some embodiments, each actuator or set of actuators 2 may have a limited patrol area (e.g., each actuator may only be configured to move its respective optical fiber 1 and end-cap 3 only within a sub-region of the focal plane). When a focus spot 4 nears or reaches the edge of a patrol area of a first actuator and associated first optical fiber, a handoff may occur whereby an adjacent second actuator and associated second optical fiber are positioned at the focus spot 4 and communications are shifted from the first optical fiber to the second optical fiber. Any data lost due to interruption in data communications during the handoff may be recovered via re-transmission of the data and/or error correction techniques.

Figure 4:
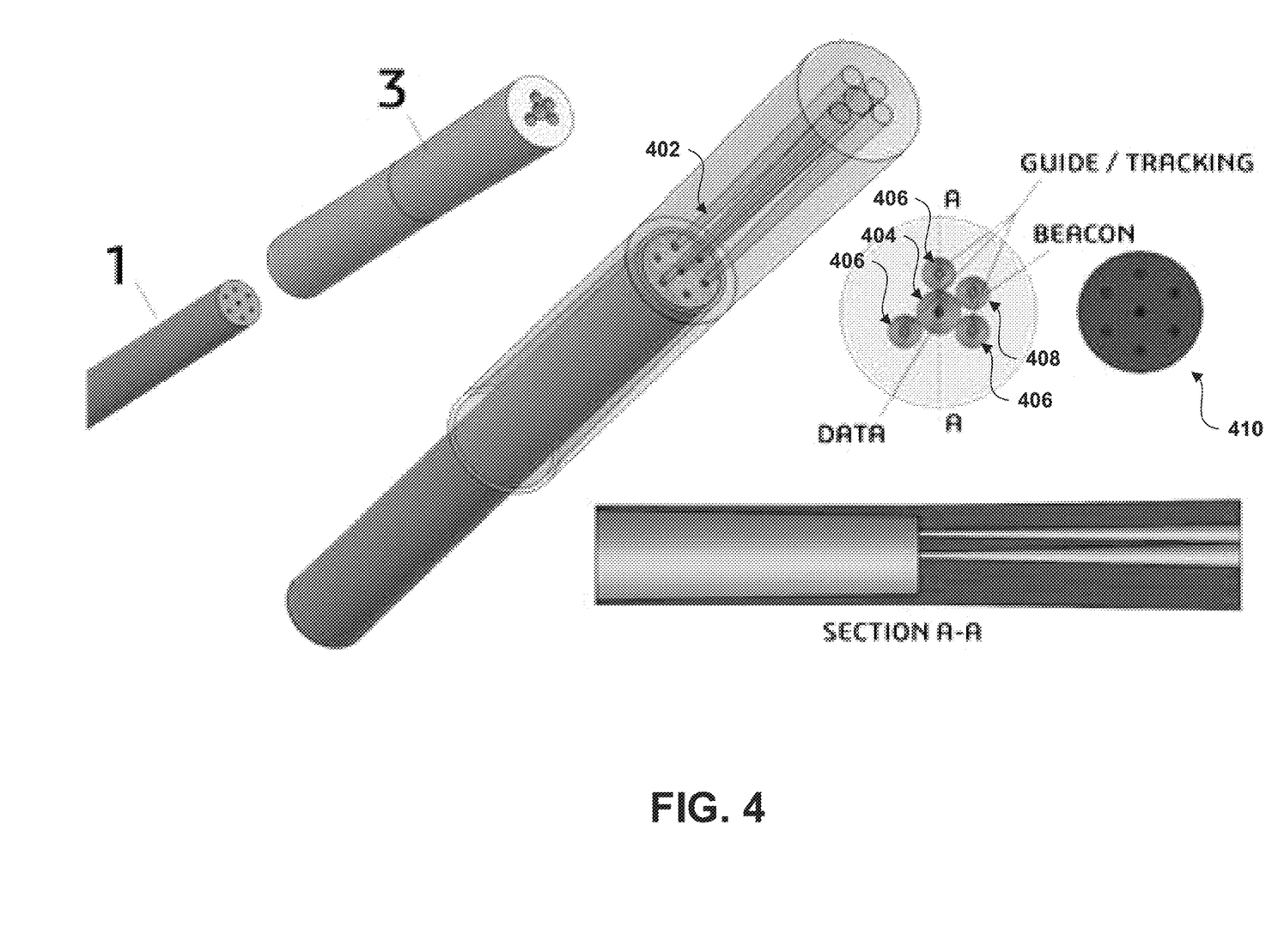
FIG. 4 shows various views of embodiments of a multi-core optical fiber and end cap, which may be used with the focal plane assembly of FIG. 3.
Figure 5:
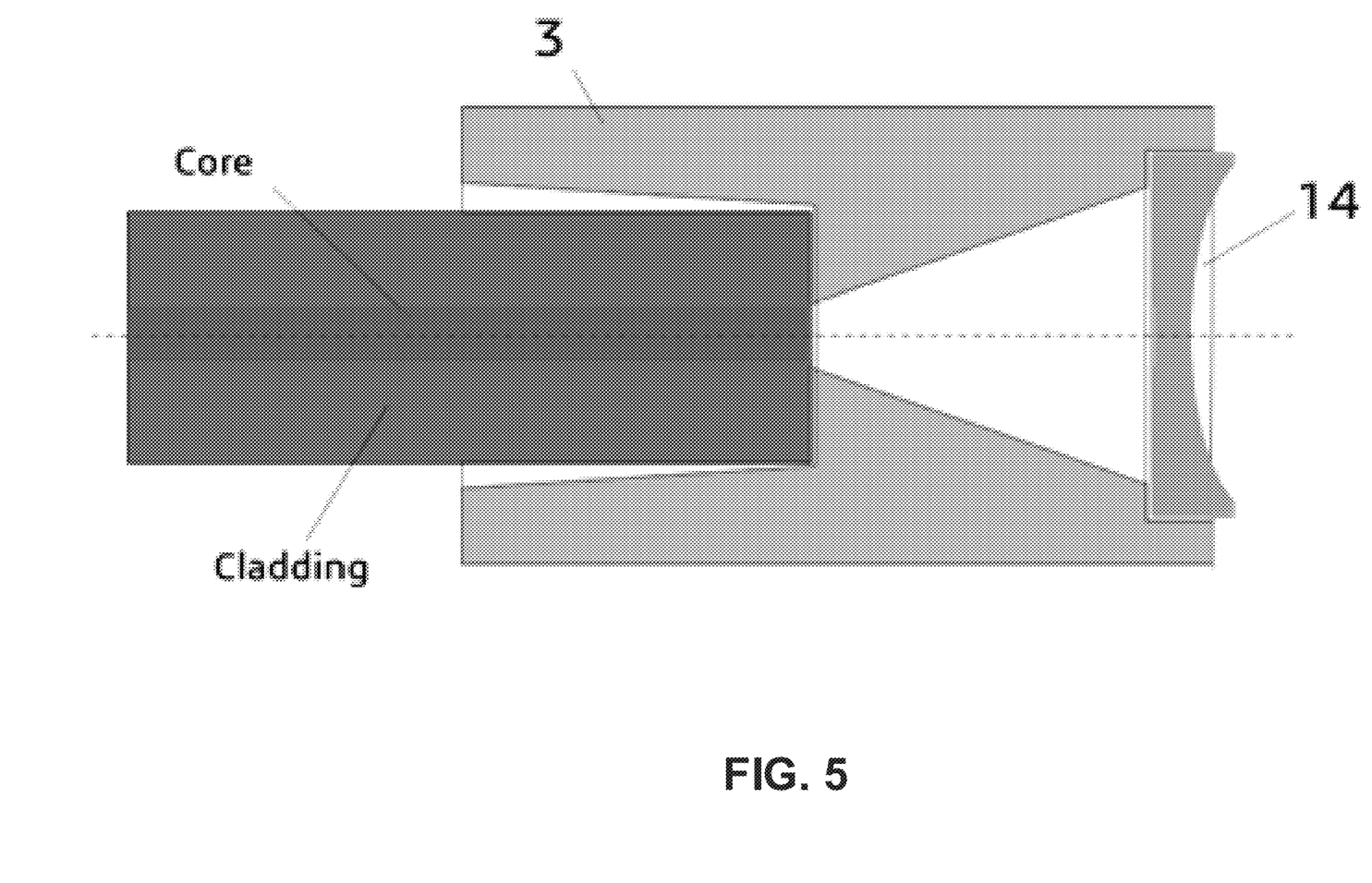
FIG. 5 is a cross-section view of another embodiment of an optical fiber with an end cap and a micro-lens, which may be used with the focal plane assembly of FIG. 3.

Detailed views of an optical fiber bundle 1 and associated end-cap 3 are shown in FIGS. 4 and 5. As shown in FIG. 4, each optical fiber or optical fiber bundle 1 may include an end cap 3. Each fiber bundle 1 may include a single cladding and multiple fiber cores. Fiber bundles with a single cladding and multiple fiber cores may be referred to as a multi-core fiber and, depending on the size (e.g., diameter) of the optical fibers, the optical fibers may be single mode (SM) or multi-mode (MM) or few-mode (FM). Fiber bundles with multiple fiber cores and a single cladding may, in some embodiments, be formed at least partially with three-dimensional micro-printing (e.g., end caps 3, cladding, and components other than the optical fibers may be 3D printed). Alternatively, each fiber bundle 1 may include multiple cores, each having a separate cladding. The end cap 3 may be configured with an optical funnel such as optical funnel 402, which may be a hollow taper, for each optical fiber within the fiber bundle. Each optical funnel 402 may improve coupling between free space optical signals and its respective optical fiber. In at least some embodiments, the surfaces of each optical funnel 402 may be selectively optically reflective to further improve coupling between free space and the optical fibers. In general, some or all of the optical fibers in each bundle may have an associated optical funnel, and the dimensions and shapes of the optical funnels may vary or may be similar to each other.

FIG. 4 illustrates each optical fiber bundle 1. The bundle includes a data fiber 404, a plurality of guide fibers 406, and a beacon fiber 408. While fibers 404 and 408 are generally referred to as a data fiber and a beacon fiber, respectively, fiber 408 may, if desired, convey signals modulated (e.g., encoded). The data fiber 404 may be centrally located within the bundle 1. In some embodiments, each fiber bundle 1 may include three guide fibers 406 disposed around the data fiber 404. In other embodiments, each fiber bundle may include more than three guide fibers (such as the six guide fibers disposed around a central data fiber as shown in bundle 410 of FIG. 4) disposed around the data fiber 404. By positioning the guide fibers 406 around the data fiber 404, the guide fibers 406 may be used in fine-tuning the position of the optical fiber bundle 1 (e.g., in aligning the data fiber 404 with a focal spot of incoming optical signals).

When the incoming light from a particular network node (e.g. a LEO satellite, an airborne vehicle, a ground station, another GEO satellite, etc.) reaches the focal plane assembly 212 through the optical antenna 210 and is within the patrol area of one of the focal plane actuators 2, the actuator 2 may coarsely position its associated fiber 1 tip and end cap 3 with enough accuracy that sufficient power is injected in one or more guide fibers through the end cap 3. In some embodiments, the initial position of an actuator 2 may be determined based on the predicted location of the focal spot for a particular network node, which may be predicted on information such as the ephemeris (e.g., known orbital trajectory) of the network node.

Referring to FIG. 3, guide fibers may be coupled to high sensitivity photodetectors 5, which may be configured to measure the power levels of optical signals injected into the guide fibers. Actuator controller 7 may obtain the measured power levels from the high sensitivity photodetectors 5 and, based on those measurements, command actuator drivers 8 to adjust the position of the relevant actuator 2 (e.g., to move the relevant actuator 2 closer towards an ideal position in which the coupling efficiency between incoming free space optical signals and an active data fiber 404, shown in FIG. 4, is maximized). Thus, the guide fibers, high sensitivity photodetectors 5, actuator controller 7, actuator drivers 8, and actuators 2 may form a closed-loop control system capable of maintaining fine tracking as a spot of light associated with incoming free space optical communications moves across the patrol area of an actuator, due to the relative motion of the communicating nodes or other effects such as vibrations.

In particular, if the fiber bundle 1 is mis-aligned from the desired focal spot, the incoming optical signals may be guided not into the data fiber 404 but into the guide fiber(s) 406 that is/are under the focal spot. Thus, the guide fiber(s) 406 under the focal spot receives a higher power level of optical signals, as compared to guide fiber(s) 406 on the opposite side of the data fiber 404. The control circuitry 7 then utilizes these differences in power levels from the different guide fibers 406 to adjust the fiber bundle 1 and move the data fiber 404 towards the focal spot. By continuously adjusting the position of the fiber bundle 1, based on measured power levels in the guide fibers 406, the control circuitry 7 can implement a closed-loop control system for maintaining the data fiber 404 at the moving focal spot.

In alternative embodiments, information in addition to or other than feedback from the guide fibers 406 may be used in performing fine pointing (e.g., fine adjustment of the position of actuators 2 and their associated optical fibers 1).

As examples, control circuitry 7 may position the actuators 2 and associated optical fibers 1 using known ephemeris of a target network node, using star trackers to identify the position and/or orientation of the transceiver, etc. Star trackers may use imaging sensors to view one or more star clusters and analyze the observations, e.g. compare the observations to a database of known star clusters, to determine the orientation of the transceiver.

In still other alternative embodiments, data can be transmitted to external network nodes by modulating the beacon signal 13. In such embodiments, the splitter 10 and isolator 11 may be omitted and the functionality of signal generator 12 integrated into the beacon generator 13. In embodiments in which a modulated beacon signal, such as beacon signal 13, is utilized to transmit data, the transceiver 200 may transmit the beacon signal and associated data in a point-to-multipoint manner (e.g., the data encoded in the beacon signal may be a broadcast that is available to all network nodes that are in a line of sight with transceiver 200 and that are within the FOV of optical assembly 210).

As shown in FIG. 5, in some embodiments a micro-lens 14 can be included as part of end cap 3. The micro-lens 14 may improve coupling between free space optical signals and an optical fiber such as the data fiber 404.

Returning to FIG. 3, once a particular fiber bundle 1 is aligned with a focal spot of incoming optical signals, the data fiber 404 of that bundle may be coupled to the free space optical signals. Optical signals in the data fiber 404 are then conveyed to splitter 10 and high-speed photodetector 6. Isolator 11 may prevent the incoming optical signals from traveling towards optical signal generator 12. If desired, the incoming optical signals may be amplified, by an amplifier, before reaching the high-speed photodetector 6. High speed photodetector 6 may convert incoming optical signals into electrical signals (e.g., digital signals) for storage, retransmission, and/or use in data processing unit 9. There may be a high speed photodetector for each and every optical fiber bundle 1 or, if desired, multiple optical fiber bundles 1 may share a photodetector and there may be optical multiplexing components, optical splitting components, or other such components to enable the photodetector to receive optical signals from a single fiber bundle 1 at a time.

In various embodiments, the transceiver may include an optical signal generator 12 that generates optical signals encoding data in order to transmit the data to other network nodes. Optical signals from generator 12 may be injected into a data fiber of the fiber bundle (e.g., data fiber 404 or a separate transmitting fiber) using beam splitter 10.

If desired, the transceiver may transmit a beacon signal using beacon generator 13. The beacon signal from beacon generator 13 may, as an example, be injected into a dedicated fiber such as beacon fiber 408 of FIG. 4. The beacon signal may be used to external communication nodes in pointing their optical systems at the transceiver.

Figure 6:
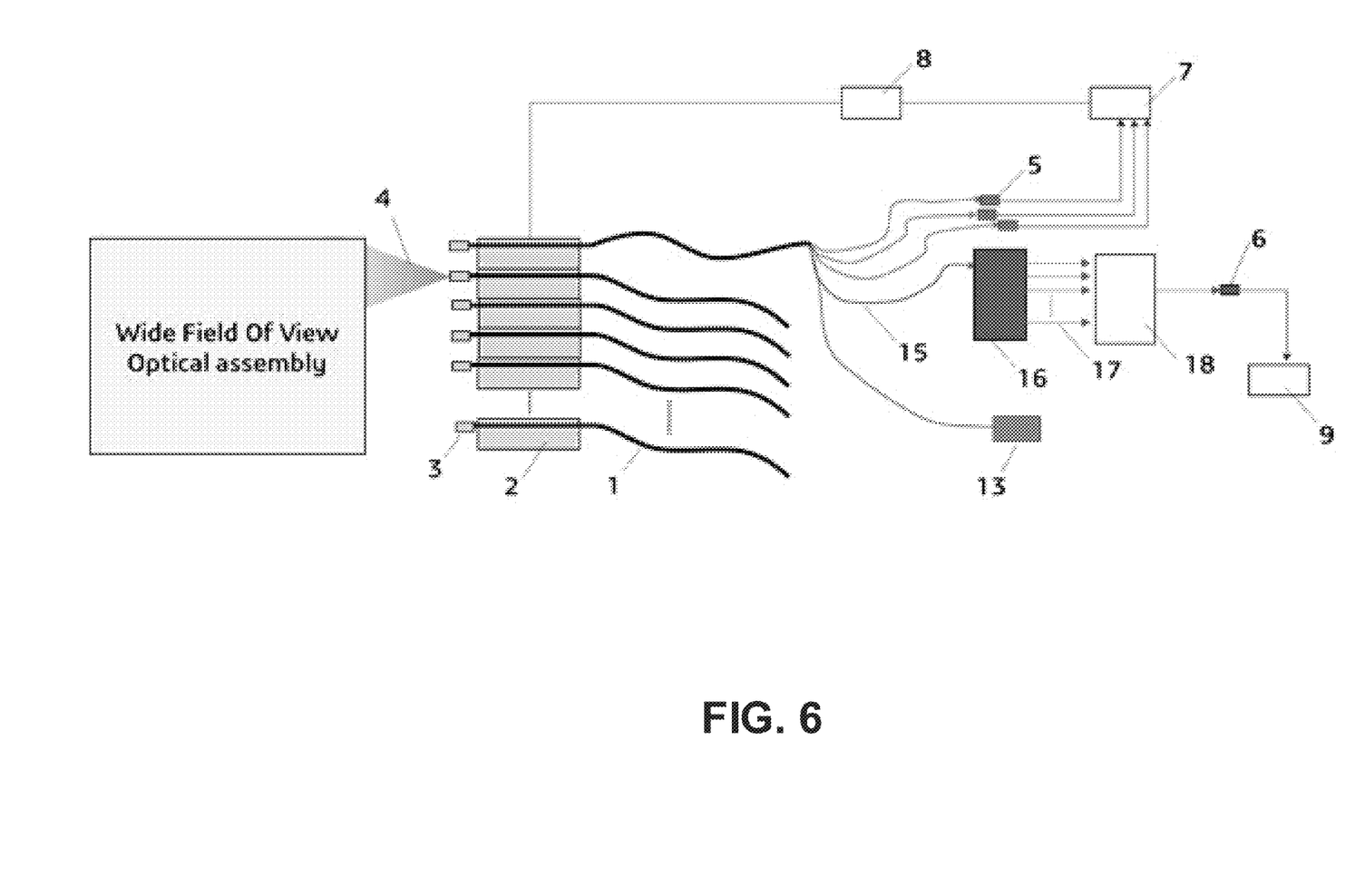
FIG. 6 is a block diagram showing another embodiment of a multi-access free-space optical communications transceiver in which incoming optical signals are injected into a multi-mode fiber or spatial mode multiplexing/demultiplexing device, which may be used with the repeater of FIG. 1.

The data fiber 404 of a fiber bundle may be a single-mode optical fiber (SMF), a few mode fiber (FMF), or a multi-mode fiber (MMF). In embodiments in which the data fiber 404 is a few or multi-mode fiber (FMF or MMF), the transceiver may be implemented with the alternate architecture shown in FIG. 6. In particular, a data fiber that is an FMF or MMF may have a larger diameter central fiber core 15. Optical signals coupled into the FMF or MMF optical fiber 15 may be coupled to a spatial mode multiplexing device 16 (e.g., a photonic lantern or other multiplexing device). Each mode of optical signals coupled from the optical fiber 15 to device 16 may be coupled, by spatial modes multiplexing device 16 into a different single mode fiber (SMF) 17. As a result, each SMF 17 carries the same signal with varying intensities, but which are not necessarily in-phase. The different SMFs 17 are coupled to a recombination unit 18 that coherently reconstructs the signal, thus increasing signal level. The recombined signal may then be conveyed to the high-speed photodetector 6, and the electrical signal is then converted to a digital signal for storage, retransmission, and/or use in data processing unit 9. The optical signal may or may not be amplified before reaching the photodetector 6.

Figure 7:
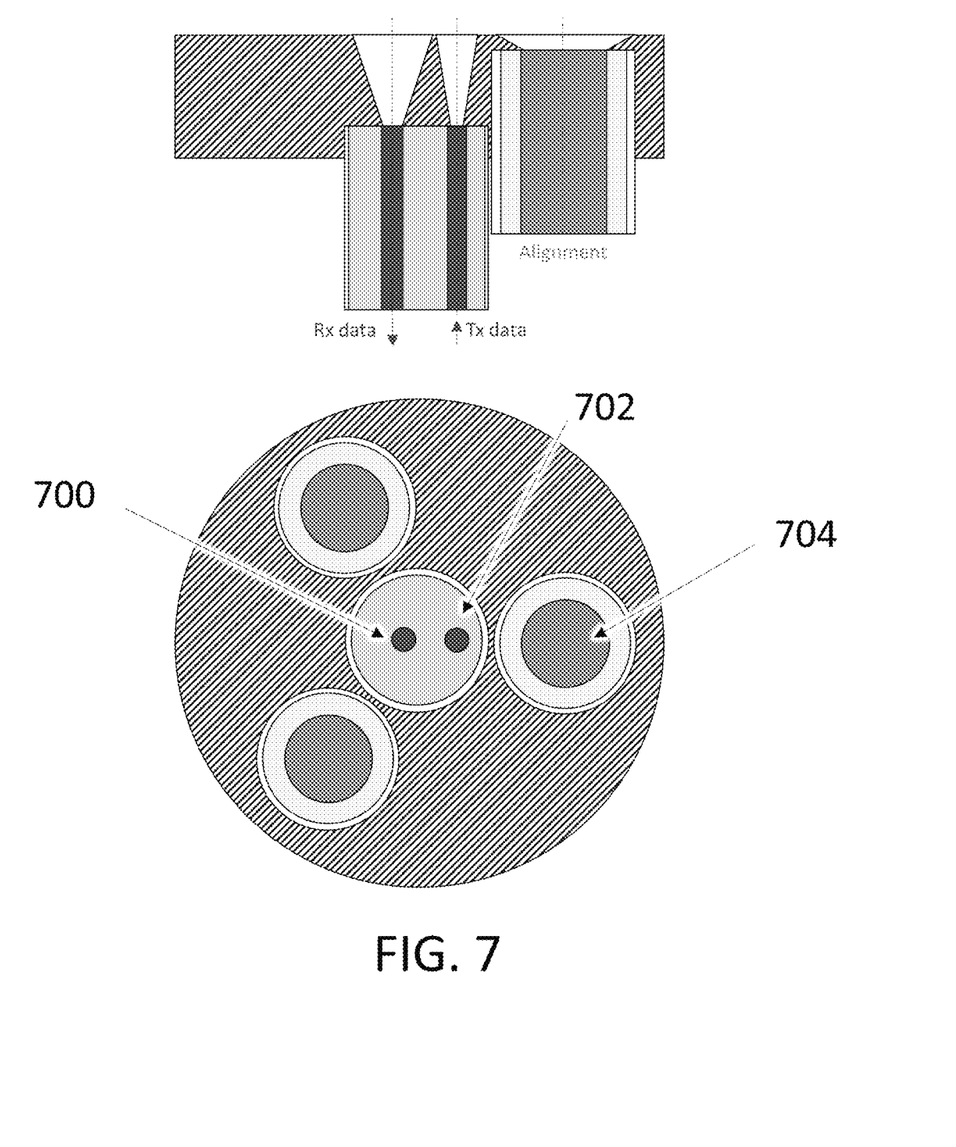
FIG. 7 are side and end views of another embodiment of a fiber bundle and end cap, which may be used with the focal plane assembly of FIG. 3.

If desired, a fiber bundle may be formed from multiple separately-clad optical fiber (as opposed to multiple optical fibers sharing a common cladding). An arrangement of this type is illustrated in FIG. 7. One advantage of forming each fiber bundle from separately-clad optical fibers is that the fiber tips can more easily be positioned at different planes. In particular, FIG. 7 illustrates a central fiber 700, which may be used for receiving optical signals, a fiber 702, which may be used for transmitting optical signals, and surrounding guide fibers 704, which may be used for guiding the fiber into position as discussed herein. As shown in FIG. 7, the guide fibers 704 may be offset from the plane of the central fiber 700 and fiber 702. Offsetting the guide fibers 704 in this manner (or in the direction opposite to that which is illustrated in FIG. 7) can advantageously defocus the beacon signals to achieve a more divergent beam and thereby increase the likely hood that the beacon signals are received by an external network node. Micro-lenses, such as the micro-lens 14 of FIG. 5, can, if desired, be included in the arrangement of FIG. 7, e.g., to improve coupling between free-space optical signals and one or more of the optical fibers 700, 702, and 704.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Some or all of the processes, methods, and algorithms described herein and/or depicted in the attached figures may be performed locally (e.g., on an assembly such as a relay satellite in which the functions are performed). Some or all of the processes, methods, and algorithms described herein and/or depicted in the attached figures may be performed remotely (e.g., on remote computing resources). As an example, ground-based computing resources may perform scheduling functionality. In particular, ground-based computing resources may determine when a relay satellite should establish and/or break connections with particular LEO satellites.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time.

The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the inventive aspects are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially described in the inventive aspects as such, one or more features from an inventive combination aspect can in some cases be excised from the combination, and the inventive combination aspect may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the listed inventive combination aspects are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following inventive aspects. In some cases, the actions recited in the inventive aspects can be performed in a different order and still achieve desirable results.

What is claimed is:

1. A focal plane assembly for a free space optical communications system, the focal plane assembly comprising:
   at least one optical element that receives incoming optical communication signals from an external network node and that focuses the incoming optical communication signals onto a focal plane;
   an array of moveable optical fibers or fiber bundles positioned at the focal plane of the at least one optical element, at least some of the optical fibers or fiber bundles comprising:
   a data fiber; and
   a plurality of guide fibers disposed adjacent the data fiber;
   a plurality of actuators, each actuator configured to adjust a position, within the focal plane, of a different one of the moveable optical fibers or fiber bundles; and
   a control circuit configured to drive the actuators based on optical signals received by the guide fibers.

2. The focal plane assembly of claim 1, wherein each optical fiber or fiber bundle comprises a data fiber and at least three guide fibers evenly arranged around the data fiber.

3. The focal plane assembly of claim 1, wherein each optical fiber or fiber bundle comprises a data fiber and at least four guide fibers evenly arranged around the data fiber.

4. The focal plane assembly of claim 1, further comprising a plurality of high sensitivity photodetectors in optical communication with the plurality of guide fibers.

5. The focal plane assembly of claim 4, wherein the control circuit is configured to drive the actuators based on measurements of optical power from the high sensitivity photodetectors.

6. The focal plane assembly of claim 1, wherein each optical fiber or fiber bundle further comprises a common cladding surrounding the data fiber and the plurality of guide fibers.

7. The focal plane assembly of claim 1, wherein each optical fiber or fiber is connected to a spatial mode multiplexing device where a signal corresponding to each mode is injected into a different optical fiber for coherent recombination and detection.

8. The focal plane assembly of claim 1, wherein each optical fiber or fiber bundle comprises a microlens on an end of the data fiber.

9. A free space optical communications system, the system comprising:
   a plurality of optical antennas having a plurality of respective focal planes, wherein each optical antenna is configured to receive incoming optical communication signals and that focuses the incoming optical communication signals onto its respective focal plane;
   a plurality of moveable optical fiber bundles, wherein each optical fiber bundle is positioned in the focal plane of a different one of the optical antennas and wherein at least some of the optical fiber bundles comprise:
   a data fiber, and
   a plurality of guide fibers disposed adjacent the data fiber;
   a plurality of actuators, each actuator configured to adjust a position, within its associated focal plane, of a different one of the moveable optical fiber bundles; and
   a control circuit configured to drive the actuators based on optical signals received by the guide fibers.

10. The system of claim 9, wherein each optical fiber bundle comprises a data fiber and at least three guide fibers evenly arranged around the data fiber.

11. The system of claim 9, wherein each optical fiber bundle comprises a data fiber and at least four guide fibers evenly arranged around the data fiber.

12. The system of claim 9, further comprising a one or more high sensitivity photodetectors in optical communication with the plurality of guide fibers.

13. The system of claim 12, wherein the control circuit is configured to drive the actuators based on measurements of optical power from the one or more high sensitivity photodetectors.

14. The system of claim 9, wherein each optical fiber bundle further comprises a common cladding surrounding the data fiber and the plurality of guide fibers.

15. The system of claim 9, wherein each optical fiber bundle is connected to a spatial mode multiplexing device where a signal corresponding to each mode is injected into a different optical fiber for coherent recombination and detection.

16. The system of claim 9, wherein each optical fiber bundle comprises a microlens on an end of the data fiber.

* * * * *